(12) United States Patent
Todoroki et al.

(10) Patent No.: US 7,979,861 B2
(45) Date of Patent: Jul. 12, 2011

(54) MULTI-PROCESSOR SYSTEM AND PROGRAM FOR CAUSING COMPUTER TO EXECUTE CONTROLLING METHOD OF MULTI-PROCESSOR SYSTEM

(75) Inventors: Akinari Todoroki, Okaya (JP); Katsuya Tanaka, Sappoto (JP)

(73) Assignee: Seiko Epson Corporation, Tokyo (JP)

( * ) Notice: Subject to any disclaimer, the term of this patent is extended or adjusted under 35 U.S.C. 154(b) by 1219 days.

(21) Appl. No.: 11/651,471

(22) Filed: Jan. 10, 2007

(65) Prior Publication Data

US 2007/0169126 A1 Jul. 19, 2007

(30) Foreign Application Priority Data

Jan. 16, 2006 (JP) ................................. 2006-007302

(51) Int. Cl.
*G06F 9/46* (2006.01)
*G06F 13/24* (2006.01)
*G06F 13/26* (2006.01)

(52) U.S. Cl. ........ 718/103; 718/102; 710/260; 710/261; 710/264

(58) Field of Classification Search .................... 718/103
See application file for complete search history.

(56) References Cited

U.S. PATENT DOCUMENTS

| 4,959,781 | A |  | 9/1990 | Rubinstein et al. |  |
|---|---|---|---|---|---|
| 5,530,891 | A |  | 6/1996 | Gephardt |  |
| 5,555,430 | A |  | 9/1996 | Gephardt et al. |  |
| 5,564,060 | A | * | 10/1996 | Mahalingaiah et al. | 710/51 |
| 5,568,649 | A | * | 10/1996 | MacDonald et al. | 710/48 |
| 5,613,126 | A |  | 3/1997 | Schmidt |  |
| 5,758,169 | A | * | 5/1998 | Nizar et al. | 710/260 |
| 5,781,187 | A |  | 7/1998 | Gephardt et al. |  |
| 5,826,081 | A | * | 10/1998 | Zolnowsky | 718/103 |
| 5,905,898 | A |  | 5/1999 | Qureshi et al. |  |
| 5,918,057 | A | * | 6/1999 | Chou et al. | 710/260 |
| 6,289,369 | B1 | * | 9/2001 | Sundaresan | 718/103 |
| 6,633,940 | B1 | * | 10/2003 | Alasti et al. | 710/262 |
| 6,665,699 | B1 | * | 12/2003 | Hunter et al. | 718/102 |
| 6,779,182 | B1 | * | 8/2004 | Zolnowsky | 718/103 |
| 6,834,385 | B2 | * | 12/2004 | Bohm et al. | 718/102 |
| 6,928,646 | B1 | * | 8/2005 | James et al. | 718/104 |

(Continued)

FOREIGN PATENT DOCUMENTS

EP 0 806 730 A2 11/1997

(Continued)

OTHER PUBLICATIONS

Yamagata; "Tech I, A Manual of SH-1 & SH-2 Microcomputer," (Interface Extra Number vol. 22) Sep. 1, 2004, pp. 22-23 (with translation).

(Continued)

*Primary Examiner* — Jennifer N To
(74) *Attorney, Agent, or Firm* — Oliff & Berridge, PLC (57) ABSTRACT

A multi-processor system with a plurality of unit processors includes: a request accepting section for accepting a first request and a second request, wherein the first request is a request to execute a program that can be executed in any of said unit processors and the second request is a request to execute a program that can be executed only in a specified unit processor among said unit processors; and a unit processor allocating section for allocating the first request and the second request accepted by said request accepting section to said unit processors according to priority of the first request and the second request.

8 Claims, 9 Drawing Sheets

U.S. PATENT DOCUMENTS

| | | | |
|---|---|---|---|
| 7,159,216 B2 * | 1/2007 | McDonald | 718/100 |
| 2002/0087618 A1 | 7/2002 | Bohm et al. | |

FOREIGN PATENT DOCUMENTS

| | | |
|---|---|---|
| GB | 2 219 420 A | 12/1989 |
| JP | A-54-23341 | 2/1979 |
| JP | A-62-145433 | 6/1987 |
| JP | A 2-50753 | 2/1990 |
| JP | A 2-122365 | 5/1990 |
| JP | A-08-55038 | 2/1996 |
| JP | A 08-297581 | 11/1996 |
| JP | A-09-282188 | 10/1997 |
| JP | A-2005-004562 | 1/2005 |
| JP | A 2005-327007 | 11/2005 |
| JP | A 2006-243864 | 9/2006 |

OTHER PUBLICATIONS

Nagai et al., "A Construction Technique of OS," Nov. 1, 2001, pp. 204-208 (with translation).

* cited by examiner

MULTI-PROCESSOR SYSTEM AND PROGRAM FOR CAUSING COMPUTER TO EXECUTE CONTROLLING METHOD OF MULTI-PROCESSOR SYSTEM

The entire disclosure of Japanese Patent Application No. 2006-007302, filed Jan. 16, 2006 is expressly incorporated by reference herein.

BACKGROUND

1. Technical Field

The present invention relates to a multi-processor system and a program for causing a computer to execute a controlling method of the multi-processor system, and specifically to a multi-processor system that can smoothly process tasks in parallel and a program for causing a computer to execute a controlling method of the multi-processor system.

2. Related Art

The processor used for a specific device is called a built-in system. Recently, a multi-processor or a multi-thread processor is used for a built-in system. The multi-processor is advantageously used to make the device have few clocks or improve the responsiveness of the device. It is desirable to use a multi-processor in a portable device in particular, as the multi-processor is also advantageous in reducing power consumption.

The determination of whether a newly developed processor operates normally or not takes time and cost. For that reason, in the field of software, if a processor that has been used and proved its good performance can be diverted, it is desirably diverted. When the built-in system is used as a multi-processor, it is requested to divert software of a previously used single processor.

A conventional technique for diverting software of a single processor (function distributed processor) for a multi-processor is described in the patent document 1 for example. The invention of the patent document 1 is for transporting an OS (Operating System) for a function distributed processor based on μITRON (registered trademark) to a multi-processor. The invention of the patent document 1 is for preferentially processing an interruption with higher urgency by accepting an interruption for which a system call is not needed to be issued while a system call for calling an OS is issued in the function distributed processor.

[Patent Document 1] Japanese Patent Laid-Open No. 8-297581

As mentioned above, when a multi-processor is operated only in the function-distributed operating system, it is difficult to cause a plurality of processors to operate in parallel. When a multi-processor is caused to operate only in an OS for SMP (Symmetric Multi Processor) type processor, there is a problem in that quantity of work for a transporting an application that is property of a single processor increases.

For a multi-processor in a built-in device, a plurality of processors (unit processors) with different functions and different features may be provided and a specific task may be allocated to a predetermined unit processor. The task executed only in the specific unit processor (fixed in a unit processor) is called a static task and a task allocated to any unit processor (not fixed in a unit processor) is called a dynamic task. The invention described in the patent document 1, however, simply uses a function-distributed operating system for a multi-processor; thus, the invention does not take into account of treating of a static task of the multi-processor in parallel processing.

The present invention is adapted in view of the abovementioned problems and intends to provide a multi-processor system that can perform parallel processing in consideration of fixing and non-fixing of a unit processor of a task by using property of a program such as an OS of a conventional function-distributed processor, and a program for causing a computer to execute a controlling method of the multi-processor system.

SUMMARY

In order to solve the above problems, the multi-processor system of the present invention is a multi-processor system with a plurality of unit processors, characterized by including a request accepting section for accepting a first request and a second request, wherein the first request is a request to execute a program that can be executed in any of the unit processors and the second request is a request to execute a program that can be executed only in a specified unit processor among the unit processors; and a unit processor allocating section for allocating the first request and the second request accepted by the request accepting section to the unit processors according to priority of the first request and the second request.

According to the invention, the first request that is a request to execute a program that can be executed in any of the unit processors and the second request that is a request to execute a program that can be executed only in a specified unit processor among the unit processors can be accepted. Then, the accepted first request and second request can be allocated to unit processor of the multi-processor according to priority of the first request and the second request.

The present invention can provide a multi-processor system that can perform parallel processing in consideration of fixing and non-fixing of a unit processor of a task even when property of a program such as an OS of a conventional function-distributed processor is used by adding a configuration for allocating to unit processors of a multi-processor according to the priority of the first request and the second request.

The multi-processor system of the present invention is characterized in that the unit processor allocating section allocates the first request and the second request to the unit processor by comparing the priority between the first request and the second request.

According to the invention, the first request and the second request can be collectively managed so that an interruption to be executed in parallel can be smoothly executed.

The multi-processor system of the invention is characterized in that the unit processor allocating section allocates the second request in priority to the first request to the unit processor.

According to the invention, when the first request and the second request compete, the second request, which can not be allocated to the other unit processor, is prioritized so that outstanding delay of processing of the second request to the processing of the first request can be prevented.

The multi-processor system of the present invention is characterized by including an allocation unit processor deciding section for deciding a unit processor that is allocated to the first request when the first request is executed.

According to the invention, the processing for dynamically allocating the first request to the unit processor can be flexibly executed.

The multi-processor system of the present invention is characterized by including an allocating unit processor setting section for previously setting a unit processor that is allocated to the second request.

According to the invention, the unit processor can be previously set for the second request that is fixed to the unit processor. For this reason, processing for selecting a unit processor when an interruption occurs can be eliminated to streamline the interruption.

The multi-processor system of the present invention is characterized in that the unit processor allocating section allocates a request to execute a task to the unit processor.

According to the invention, parallel processing with a task being a unit can be smoothly executed.

The multi-processor system of the present invention is characterized in that the unit processor allocating section allocates a request to execute an interruption that request to suspend the other tasks to the unit processor.

According to the invention, parallel processing can be smoothly executed even when an interruption such as an external interruption occurs.

The program for causing a computer to execute a controlling method of a multi-processor system of the present invention is a program for causing a computer to execute a controlling method of the multi-processor system to be applied to the multi-processor system with a plurality of unit processors, characterized by including a request accepting step of accepting a first request and a second request, wherein the first request is a request to execute a program that can be executed in any of the unit processors and the second request is for accepting a request to execute a program that can be executed only in a specified unit processor among the unit processors; and a unit processor allocating step of allocating the first request and the second request accepted at the request accepting step to the unit processors according to priority of the first request and the second request.

According to the invention, a program for causing a computer to execute a controlling method of a multi-processor system that can perform parallel processing in consideration of fixing and non-fixing of a unit processor of a task even when property of a program such as an OS of a conventional function-distributed processor is used by adding a step of allocating to unit processors of a multi-processor according to the priority of the first request and the second request can be provided.

DETAILED DESCRIPTION OF THE PREFERRED EMBODIMENTS

Embodiments of a multi-processor system according to the present invention, a program for causing a computer to execute a controlling method for the multi-processor system will be described with reference to the drawings. The multi-processor system of the present embodiment has a plurality of unit processors.

Figure 1A:
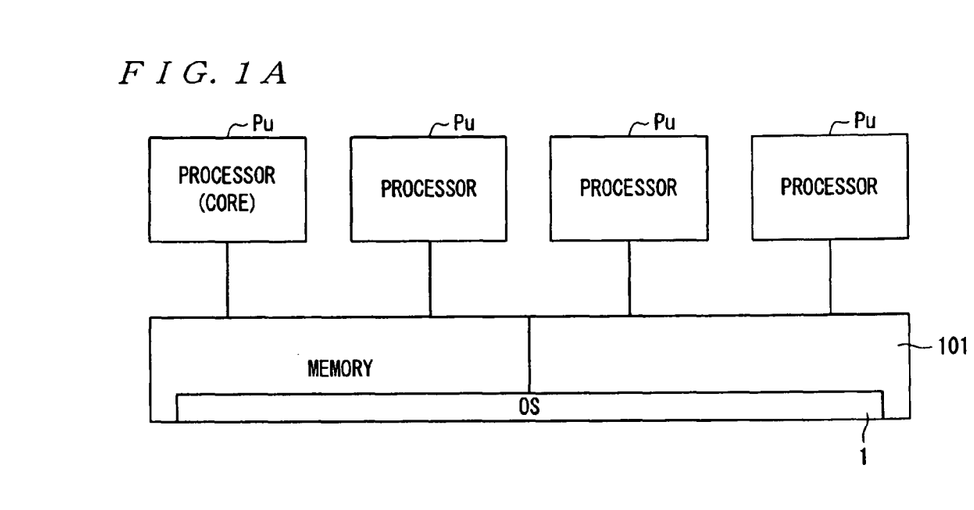
FIGS. 1A and 1B are diagrams for illustrating general exemplary configurations according to combinations of a plurality of unit processors.
Figure 1B:
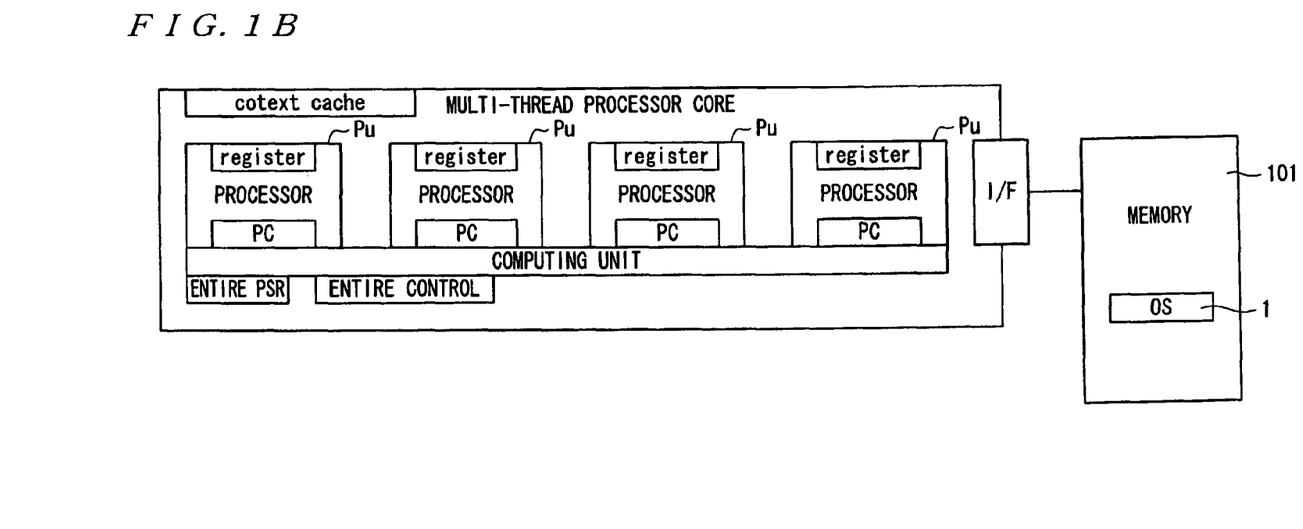

FIGS. 1A and 1B are diagrams for illustrating examples of general configurations according to combinations of a plurality of unit processors. Each of multi-processor systems shown in FIGS. 1A and 1B is configured that a plurality of unit processors Pu are coupled so as to share a memory. The configuration shown in FIG. 1A is a configuration called a multi-processor, while the configuration shown in FIG. 1B is called a multi-thread processor. In the multi-thread processor, unit processors Pu are more closely combined with each other than in the multi-processor in that a computing unit is shared.

In either in the multi-processor and the multi-thread processor shown in FIGS. 1A and 1B, a plurality of unit processors Pu share a memory 101, which keeps an OS (Operating System) 1 therein. The OS1 is for controlling interruption of a task or an interruption handler in the multi-processor system of the embodiment.

In the embodiment, an example in which a multi-processor system is adapted as a multi-processor will be described, but the multi-processor system can be adapted with a multi-thread processor.

Figure 2:
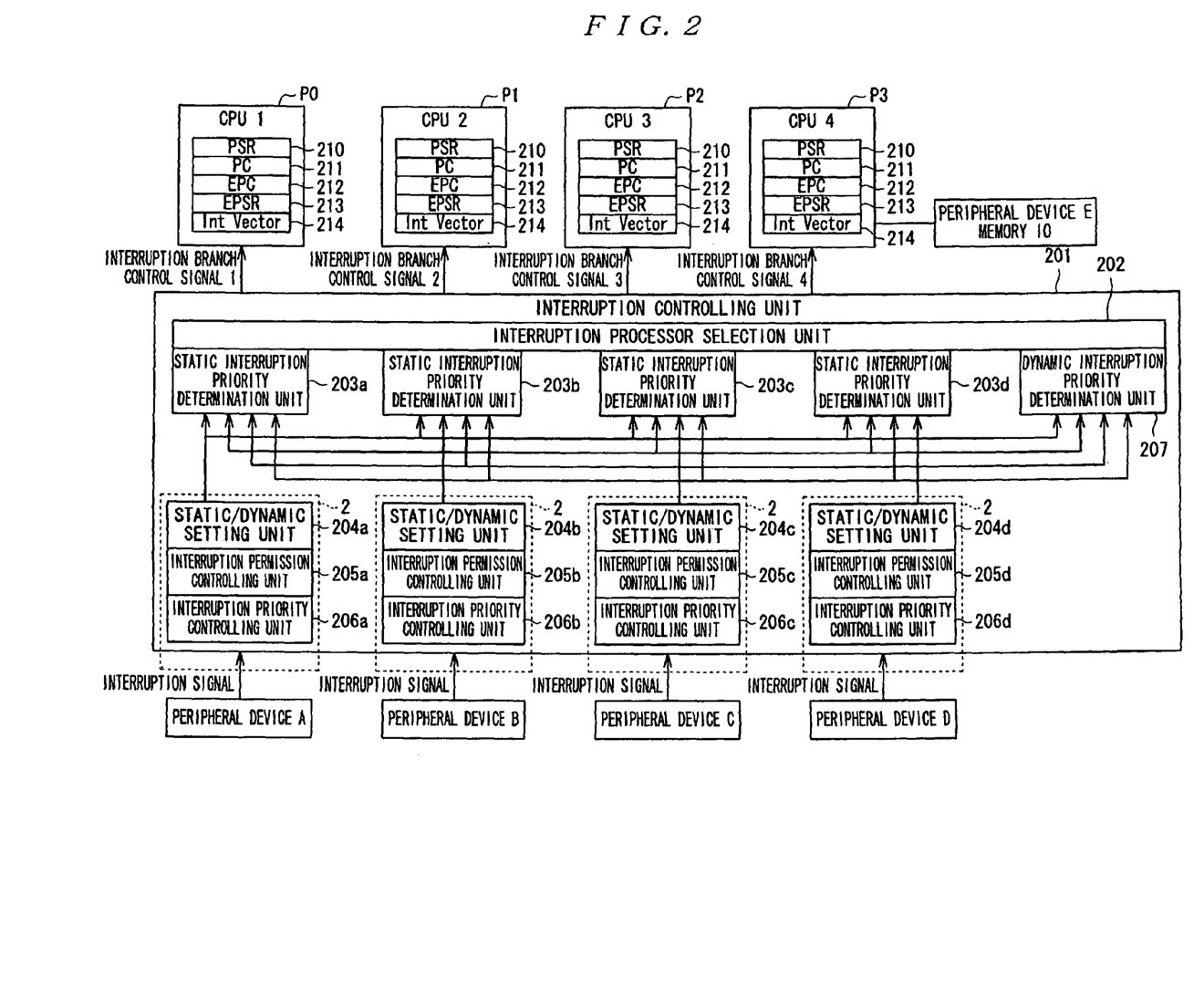
FIG. 2 is a drawing for illustrating a multi-processor of an embodiment of the present invention.

FIG. 2 is a diagram for illustrating a multi-processor of the embodiment of the present invention. The multi-processor shown in the figure has a plurality of unit processors P0 to P3, and an interruption controlling unit 201 for controlling an interruption to the unit processors P0 to P3. The multi-processor connects with five peripheral devices A, B, C, D, and E (the peripheral device D is an I/F of an external memory) each of which requests the unit processors P0 to P3 to interrupt via the interruption controlling unit 201. Such a multi-processor is applied to a built-in processor that is used for a cellular phone, for example. If the multi-processor is used for a cellular phone, the peripheral devices A to D are operation buttons, a camera device or a wireless device.

Each of the unit processors P0 to P3 has a status register (PSR) 210 that keeps a status of each of the unit processors (for example, a status indicating whether an interruption can be done or not, a status of occurrence of over flow in a unit processor and the like), and a program counter (PC) 211 that stores a memory address, in which an instruction to be executed next by a unit processor is kept.

Each of the unit processors P0 to P3 has an exceptional processing program counter (EPC) 212, an exceptional processing status register (EPSR) 213, and an interruption vector (IntVector) 214. The EPC212 is a register for saving an address kept in the PC 211 when any of the peripheral devices A to D requests an interruption. The EPSR 213 is a register for saving information kept in the PSR 210. The Intvector 214 is for keeping an address of a program to be branched to in a form of a table according to a kind of interruption.

The interruption controlling unit 201 has an interruption signal-receiving unit 2 for each of the peripheral devices A to D. The first request indicates a request for executing a task generally called a dynamic task. In the embodiment, a request by an interruption is descried described as a dynamic interruption. The second request indicates a request for executing a task generally called a static task. In the embodiment, a request by an interruption is described as a static interruption. In the embodiment, there are a task that is managed by a scheduler or the like created by the OS1 and a non-task that cannot be managed by the OS1 as it is requested from outside. In the embodiment, an interruption by the non-task is described as an interruption handler.

The abovementioned tasks of the dynamic task and the static task may indicate a unit of processing of a program. In the embodiment, however, only processing managed by a scheduler or the like created by the OS1 is described as a task and processing that cannot be managed by the OS1 because it is requested from outside is described as a non-task. In the embodiment, an interruption by the non-task is also described as an interruption handler. Either the static interruption or the dynamic interruption is an interruption handler.

Each of the four interruption signal receiving units 2 shown in the figure has the same configuration (for this reason, an interruption signal receiving unit 2 of the peripheral device A will be described). That is to say, the interruption signal receiving unit 2 has an interruption priority controlling unit 206*a* for accepting an interruption signal outputted from the peripheral device A, an interruption permission controlling unit 205*a*, and a static/dynamic setting unit 204*a*.

The interruption signal is a signal for the peripheral device A to request the multi-processor to execute an interruption. The interruption priority-controlling unit 206*a* has a configuration for setting priority of an interruption according to what the interruption signal indicates. The interruption permission controlling unit 205*a* has a configuration for determining whether or not to permit an interruption request from the peripheral device A based on setting or the like of external interruption prohibition for the entire multi-processor.

The static/dynamic setting unit 204*a* is configured that it identifies whether a processing request by an interruption signal from the interruption handler is the static interruption or the dynamic interruption and sends the indication to the interruption controlling side. Each of the static/dynamic setting units 204*a* to 204*d* is a definition register for each of the interruption handler. The registers below are assumed here for example.

bit 4
static interruption [0]/dynamic interruption [1]
bit 3 to 0
the numbers of unit processors to be executed for the static interruption.

In the case of a static interruption, a unit processor allocated for performing an interruption is preset by a peripheral device that requested the interruption. The static/dynamic setting unit 204*a* that generates information for identifying the unit processor is an allocating unit processor-setting unit for previously setting information for identifying a unit processor to be allocated to the static interruption.

Setting of the static/dynamic setting unit 204*a* is specified in processing at initialization of the multi-processor. By taking an example of the μITRON (registered trademark), a system call (DEF_INH) is present as a definition of each interruption handler. By extending the system call, a unit processor is set for a static definition register (IO register).

The determination of whether it is a dynamic task or a static task is realized by extending a system call CRE_TSK for generating a task in the μITRON (registered trademark).

The interruption controlling unit 201 has four static interruption priority determination units 203*a*, 203*b*, 203*c* and 203*d* corresponding to the four processors P0 to P3 respectively and a dynamic interruption priority determination unit 207.

Each of the static interruption priority determination units 203*a* to 203*d* accepts a static interruption request that can be executed only in the specified unit processors in the unit processors P0 to P3. The dynamic interruption priority determination unit 207 accepts a dynamic interruption request that can be executed in any of the unit processors P0 to P3. Such static interruption priority determination units 203*a* to 203*d* and the dynamic interruption priority determination unit 207 comprise a request accepting section of the embodiment.

Each of the static interruption priority determination units 203*a* to 203*d* and the dynamic interruption priority determination unit 207 is a register for managing priority of processing executed by a corresponding processor. It is assumed what indicated in the register is as below.

bit 6
indicating a state of a processor (RUN[1]/HALT[0])
bit 4
indicating a state of an interruption [1]/task execution [0] for the RUN state
bit 3 to 0
indicating priority of a task in a RUN state for the RUN state The register is written by software.

The OS1 allocates a request of a static task and a request of a dynamic task currently accepted to the unit processors P0 to P3. The OS1 selects the unit processors to be allocated to a static task and a dynamic task according to priority of each request of a static task and a dynamic task.

Thus, the OS1 selects a unit processor by comparing priority of a currently occurring processing with that of a currently processed task and an interruption handler based on information managed in the static interruption priority determination units 203*a* to 203*d* and the dynamic interruption priority determination unit 207. The OS1 is a unit processor allocation section of the embodiment. OS1 requests the unit processors P0 to P3 to execute a static task and a dynamic task. The task may be an interruption to be executed that suspends the other tasks. Selection of a unit processor by the OS1 will be detailed later.

Next, an operation of a configuration shown in FIG. 2 will be described below.

Each of the unit processors P0 to P3 reads an instruction from an external memory or the like (not shown) and processes the instruction for each task. The tasks include a static task that is executed only in the specified unit processor in the unit processors P0 to P3 and a dynamic task that can be executed in any of a plurality of unit processors.

Each of the peripheral devices A to E processes an interruption and requests a necessary request for each device to the multi-processor. The processing is requested by out putting information for indicating a self-device for an allocation signal accepting unit 2 and information indicating processing or the like a task.

The allocation signal accepting unit 2 into which an allocation signal is inputted generates a signal indicating priority of an interruption handler or a signal indicating whether it is static or dynamic based on an interruption signal. When an interruption for a multi-processor is permitted, the unit 2 sends out the generated signal to the static interruption priority determination unit 203a and the dynamic interruption priority determination unit 207.

When the sent out signal is for requesting a static interruption, each of the static interruption priority determination units 203a to 203c determines priority of a task currently operating in the processor and an interruption handler. When a dynamic interruption is requested, the dynamic interruption priority determination unit 207 determines priority of a task operating in all the processors and an interruption handler. The interruption processor selection unit 202 decides the unit processor to execute an interruption based on the determination by the static interruption priority determination units 203a to 203c and the dynamic interruption priority determination unit 207.

The interruption processor selection unit 202 allocates a static interruption or a dynamic interruption to a single unit processor (for example, a unit processor P0) by comparing priority between a static interruption and a dynamic interruption. With the configuration, the embodiment can install a concept of a static task into parallel processing even when a function distribution OS is used.

A unit processor to be allocated to a dynamic task is decided when the OS1 executes a task. For this reason in the embodiment, the OS1 functions as an allocation unit processor deciding section.

Thus, the OS1 generates an execution schedule of tasks based on priority of dynamic tasks and static tasks executed as processing other than an interruption handler. The execution schedule of tasks is, for example, represented by a ready queue that records tasks to be executed by each unit processor in the order of execution.

Figure 3:
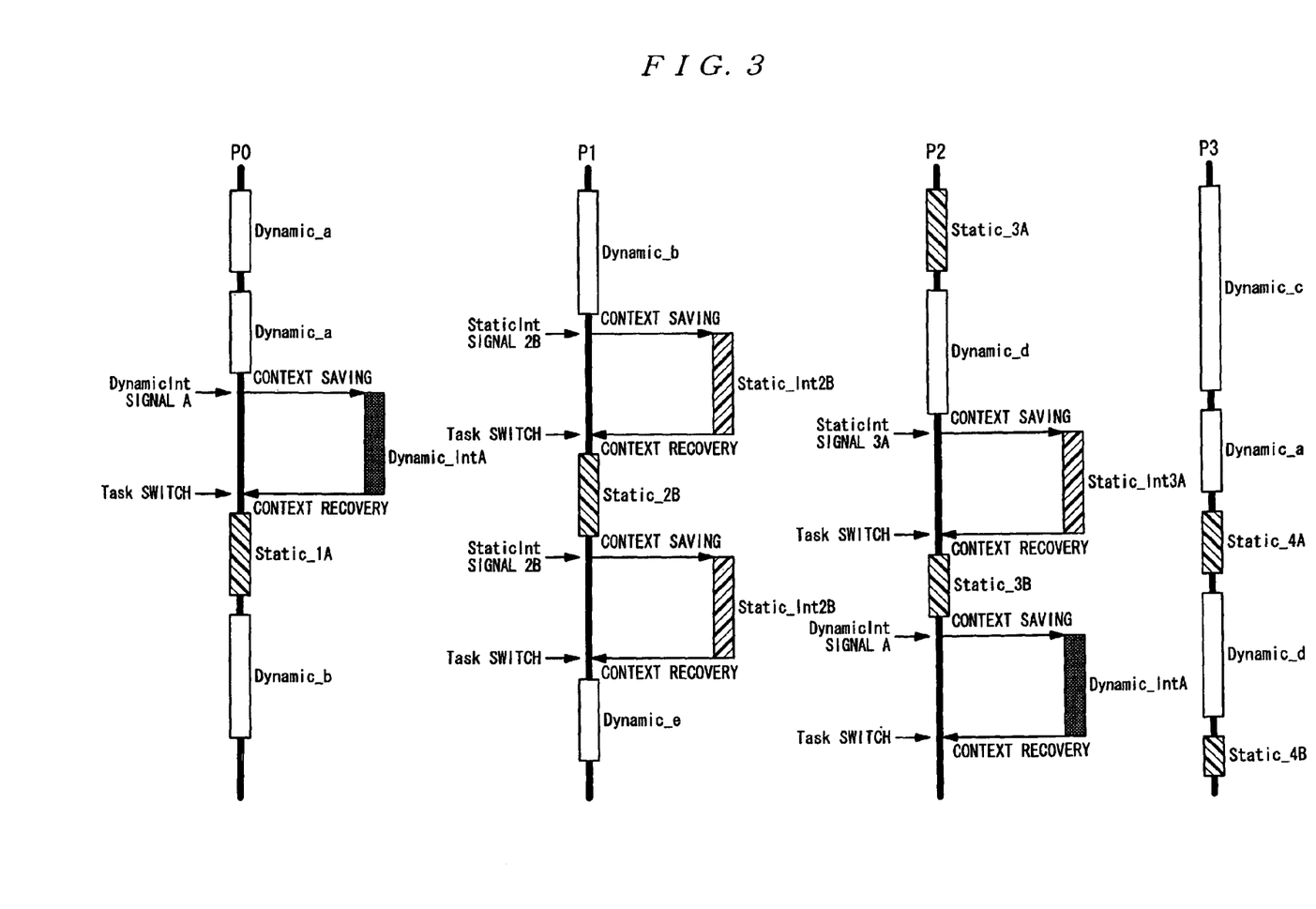
FIG. 3 is a diagram for illustrating an operation of the unit processor shown in FIG. 2.

Each of the abovementioned unit processors of the embodiment operates as shown in FIG. 3, for example. In the example shown in FIG. 3, a processing part represented by notation such as Dynamic_a indicates a dynamic task that is other than an interruption handler. A processing part represented by notation such as Dynamic_IntA indicates a dynamic interruption that is executed as an interruption handler.

A processing part represented by notation such as Static_a indicates a static task that is other than an interruption handler. A processing part represented by notation such as Static_IntA indicates a static interruption that is executed as an interruption handler. The number following the Static_ of the static task indicates a unit processor to be fixed (It is indicated that Static_1 is allocated to the unit processor P0, Static_2 to the unit processor P1, Static_3 to the unit processor P2, and Static_4 to the unit processor P3).

Next, processing to be executed by the OS1 of the multi-processor of the embodiment will be described in more detail. FIGS. 4 to 7 are diagrams of illustrating task processing performed in the multi-processor of the embodiment.

Figure 4:
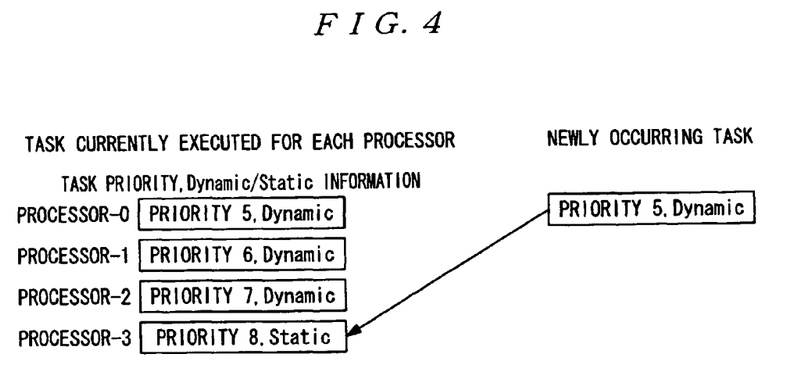
FIG. 4 is a diagram for illustrating an interruption executed by the multi-processor of the embodiment.

In an example shown in FIG. 4, the unit processor P0 executes a dynamic task of the priority 5, the unit processor P1 executes a dynamic task of the priority 6, and the unit processor P2 executes a dynamic task of priority 7. The unit processor P3 executes a static task of the priority 8. In FIGS. 4 to 7, the smaller the number of the priority, higher the priority of the task is.

When any of the tasks requests the dynamic task of the priority 5 in this condition, the OS1 operates as below. The OS1 detects that the unit processor that executes a task of the lowest priority among the tasks currently executed by the unit processors P0 to P3 is the unit processor P3.

The OS1 determines whether the currently requested task, the task executed by the unit processor P3 is static or dynamic. In the example shown in FIG. 4, the task executed by the unit processor P3 is static and the currently requested task is dynamic.

In the example shown in FIG. 4, as the priority of the dynamic task is higher than the priority of the static task, the unit processor P3 executes a new requested task instead of the task currently executed.

Figure 5:
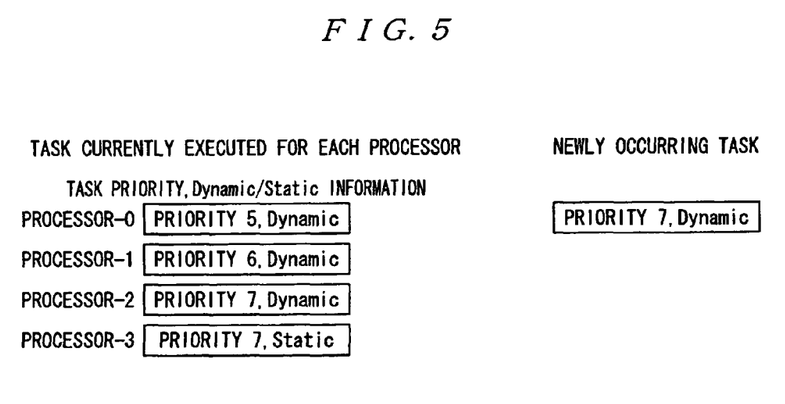
FIG. 5 is another diagram for illustrating an interruption executed by the multi-processor of the embodiment.

In the example shown in FIG. 5, the unit processor P0 executes a dynamic task of the priority 5, the unit processor P1 executes a dynamic task of the priority 6, the unit processor P2 executes a dynamic task of the priority 7, and the unit processor P3 executes a static task of the priority 7.

When any of the tasks requests the dynamic task of the priority 7 in this condition, the OS1 detects the presence of the task whose priority is lower than the currently requested task among the currently executed tasks at the unit processors P0 to P3.

Next, the OS1 determines whether the currently requested task, the task executed by the unit processor P3 is static or dynamic. In the example shown in FIG. 5, there is no task whose priority is lower than that of the currently requested task. The OS1 also detects that the task whose priority is the same as that of the task currently executed by the unit processor P3 is a static task and that the requested task is a dynamic task.

In such a case, in the embodiment, a static task is executed in priority to a dynamic task in principle. If the priority of the processing executed first is the same as that of the currently requested processing, a task switch is not executed according to the specification of the μITRON (registered trademark).

In the example shown in FIG. 5, as the priority of the dynamic task is the same as that of the static task, the unit processor P3 continues in executing a task and does not execute a newly requested task (does not add in a ready queue).

With such processing, the embodiment allocates static in priority to dynamic to the unit processor that can execute static allocation. In this manner, the embodiment can prevent static interruption from being delayed while executing an interruption with higher priority.

Here, it is assumed that a static task is processed in priority to a dynamic task when their priority is the same. The present invention is not limited to the configuration, however, and may be adapted to always prioritize a static task when a dynamic task and a static task compete in a processor.

Figure 6:
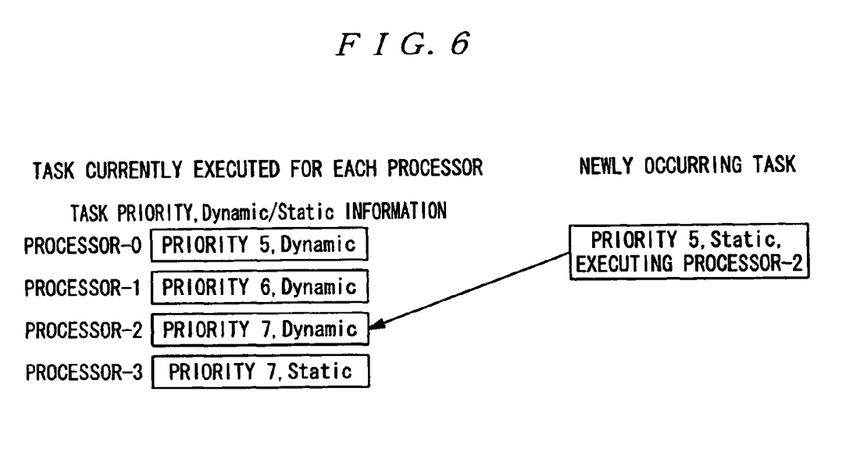
FIG. 6 is another diagram for illustrating an interruption executed by the multi-processor of the embodiment.

In the example shown in FIG. 6, the unit processor P0 executes the dynamic task of the priority 5, the unit processor P1 executes the dynamic task of the priority 6, the unit processor P2 executes the dynamic task of the priority 7, and the unit processor P3 executes the static task of the priority 7.

When any of the tasks requests the static task of the priority 5 that can operate only in the unit processor P2 in this condition, the OS1 compares the priority of the task that is currently executed by the unit processor P2 and the priority of the currently requested task.

In the example shown in FIG. 6, as the priority of the currently requested task is higher than that of the task currently executed in the unit processor P2, the unit processor P2 executes a newly requested task instead of the task executed by the unit processor P2.

Figure 7:
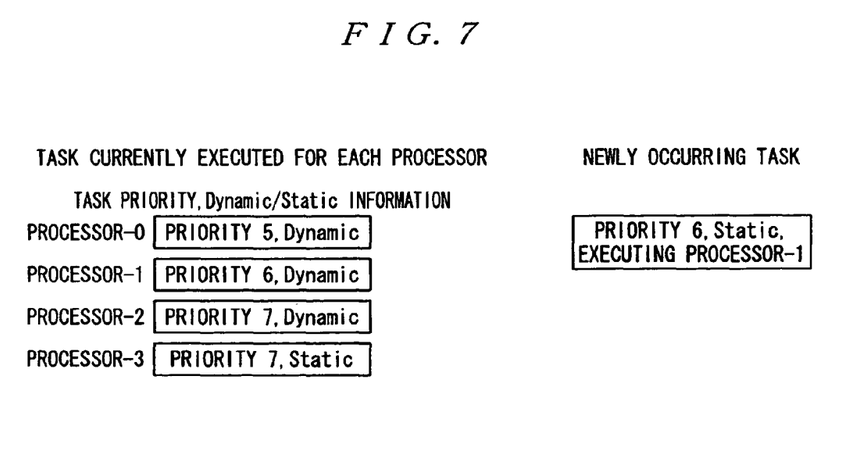
FIG. 7 is another diagram for illustrating an interruption executed by the multi-processor of the embodiment.

In the example shown in FIG. 7, the unit processor P0 executes the dynamic task of the priority 5, the unit processor P1 executes the dynamic task of the priority 6, the unit processor P2 executes the dynamic task of the priority 7, and the unit processor P3 executes the static task of the priority 7.

When any of the tasks requests the static task of the priority 6 that can operate only in the unit processor P1 in this condition, the OS1 compares the priority of the task that is currently executed by the unit processor P1 and the priority of the currently requested interrupting task.

In the example shown in FIG. 7, as the priority of the currently requested task is lower than that of the task currently executed in the unit processor P2, the unit processor P1 continues executing a task without executing a newly requested task.

Now, a controlling method of a multi-processor system executed in the multi-processor of the abovementioned embodiment.

Figure 8:
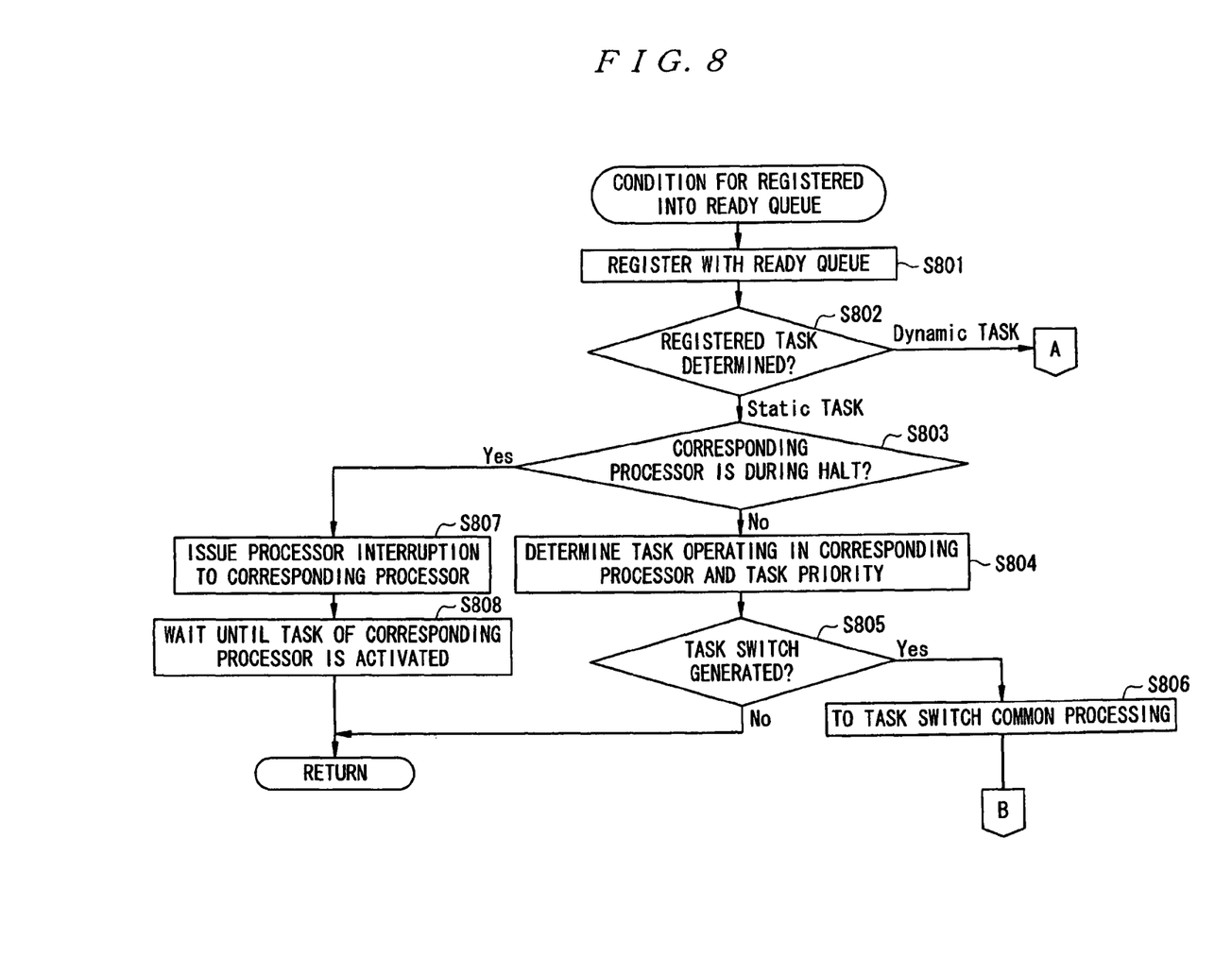
FIG. 8 is a flowchart for illustrating an operation when a static task and a dynamic task according to an OS of an embodiment of the present invention are processed.

FIG. 8 is a flowchart for illustrating an operation when the OS1 processes a static task or a dynamic task. When a condition for being registered into a ready queue is fulfilled, the OS1 considers that a new task occurs and registers the task in the ready queue (S801). The condition for being registered into the ready queue is that any of the unit processors P0 to P3 executes a send message, for example.

Next, the OS1 determines whether the registered task is dynamic or static (S802). If the task is a static task, whether the unit processor previously allocated to the task is during HALT or not is determined (S803). If the unit processor is during HALT (S803: YES), the OS1 issues an inner interrupting request to the unit processor allocated to the task (S807) and waits until the unit processor, for which the inner interrupting request was issued, has been activated (S808). When the unit processor has been activated, the processing returns from that by the OS to processing for executing a task.

Figure 9:
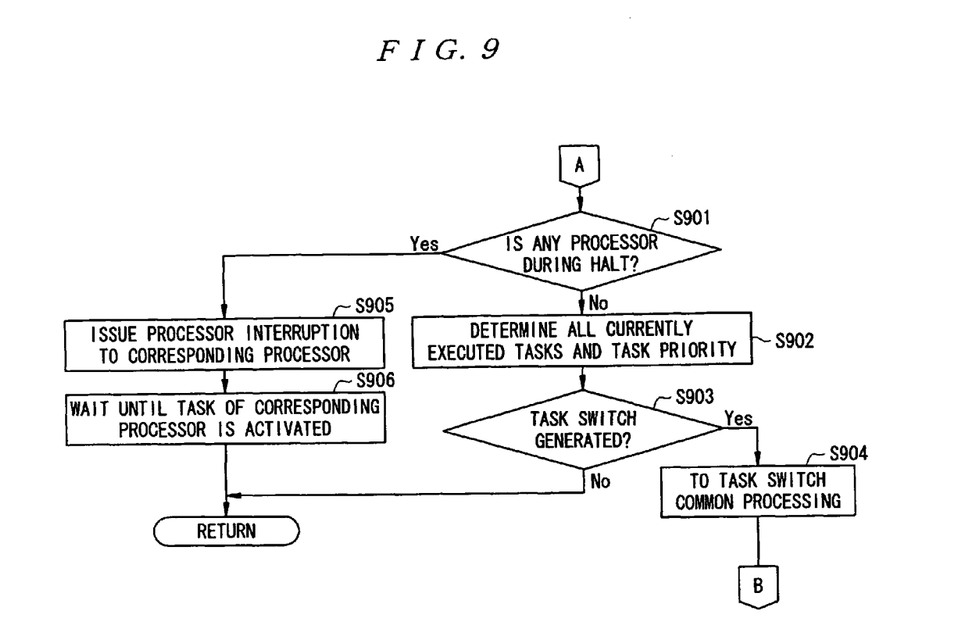
FIG. 9 is another flowchart for illustrating an operation when a static task and a dynamic task according to an OS of an embodiment of the present invention are processed.

If it is determined that the task is a dynamic task at the step S802, the processing shown in the flowchart of FIG. 9 starts. Thus, the OS1 determines whether a unit processor during HALT is present in the multi-processor or not as shown in the flowchart of FIG. 9 (S901). If there is a unit processor during HALT (S901: Yes), the OS1 issues an inner interrupting request to the unit processor (S905). Then, the OS1 waits until the unit processor, for which the inner interrupting request was issued, has been activated (S906).

If it is determined that there is no unit processor during HALT at the step S901 (S901: No), the OS1 compares the priority of the task executed by all of the unit processors P0 to P3 and the priority of the task that is currently requested to interrupt (S902). As a result, if all the currently executed tasks have higher priority than that of the currently requested task (S903: No), the OS1 returns to the task processing without generating a task switch.

On the other hand, if there is a task whose priority is lower than that of the currently requested task in the currently executed tasks, the OS1 generates a task switch (S903: Yes). After generating the task switch, the OS1 executes a general task switch common processing that is involved with the task switch (S904).

If the unit processor previously allocated to the task is not during HALT (S803: No), the OS1 compares the priority of the task that is currently executed by the unit processor and the priority of the currently requested task (S804). As a result, if a currently executed task has higher priority than that of the currently executed task (S805: No), the OS1 returns to the task processing without generating a task switch.

On the other hand, if a currently executed task has lower priority than that of the currently requested task, the OS1 generates a task switch (S805:Yes). After generating a task switch, the OS1 executes a general task switch common processing that is involved with the task switch (S806).

Figure 10:
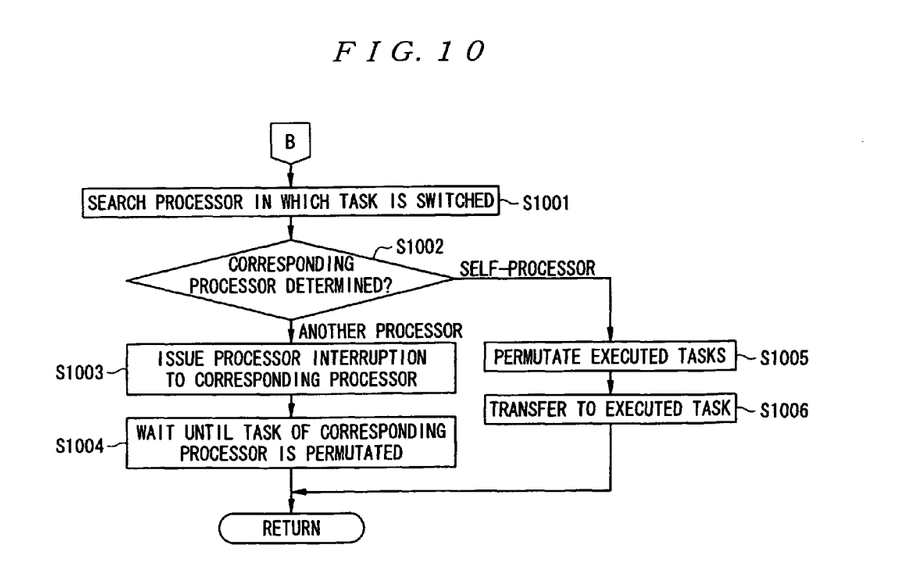
FIG. 10 is another flowchart for illustrating an operation when a static task and a dynamic task according to an OS of an embodiment of the present invention are processed.

FIG. 10 is a flowchart for illustrating task switch common processing shown in FIGS. 8 and 9. The task switch common processing is the processing executed by all the unit processors P0 to P3 when a task switch is generated. The unit processors P0 to P3 first searches and identifies the unit processor that executes a task switch (S1001). As a result of searching, if the unit processor that performs a task switch is the self-processor (S1005), after saving or the like of data according to the currently executed task, permutation is executed (S1005). Then, the task is transferred to the task that is to be processed after switching (S1006).

On the other hand, if it is determined that the unit processor that performs a task switch is the other unit processor at the step S1002 (S1002: No), an interruption occurs at the other processor that is to perform a task switch (S1003). The unit processor that is not an object of the current task waits until the unit processors that are to perform a task switch have been permutated (S1004) and returns from OS processing to task processing.

Figure 11:
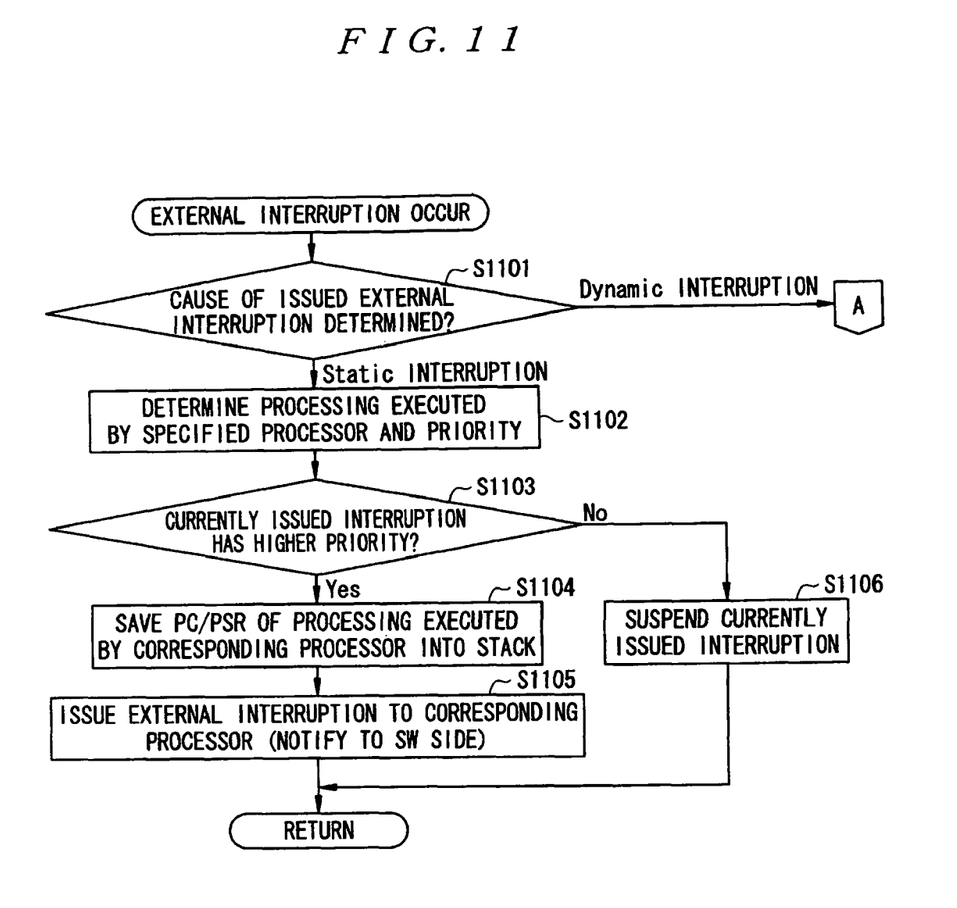
FIG. 11 is a flowchart for illustrating an operation when a static interruption and a dynamic interruption by an external interruption of an embodiment of the present invention is processed.

FIG. 11 is a flowchart for illustrating an operation when the interruption controlling unit 201 processes a static interruption and a dynamic interruption. When an external interruption is issued, the interruption controlling unit 201 determines whether the issued external interruption is a dynamic interruption or a static interruption (S1101). As the result of the determination, if the interruption handler is a static interruption (S1101: Static interruption), the priority of the task and the interruption handler that are executed by the unit processor (specified unit processor) allocated to the static interruption and the priority of the interruption handler of the currently requested static interruption (S1102) are compared.

If the priority of the currently requested static interruption is higher as a result of the determination at the step S1102 (S1103: Yes), the specified unit processor saves information (PSR210, PC211) relating to the previously processed processing (S1104). After saving the information, the interruption controlling unit 201 issues an external interruption to the specified unit processor (S1105).

If it is determined that the priority of the currently requested static interruption is lower than that of the task and the interruption handler that have been previously executed by the specified unit processor (S1103: No), the interruption controlling unit 201 suspends the current interruption request (S1106).

Figure 12:
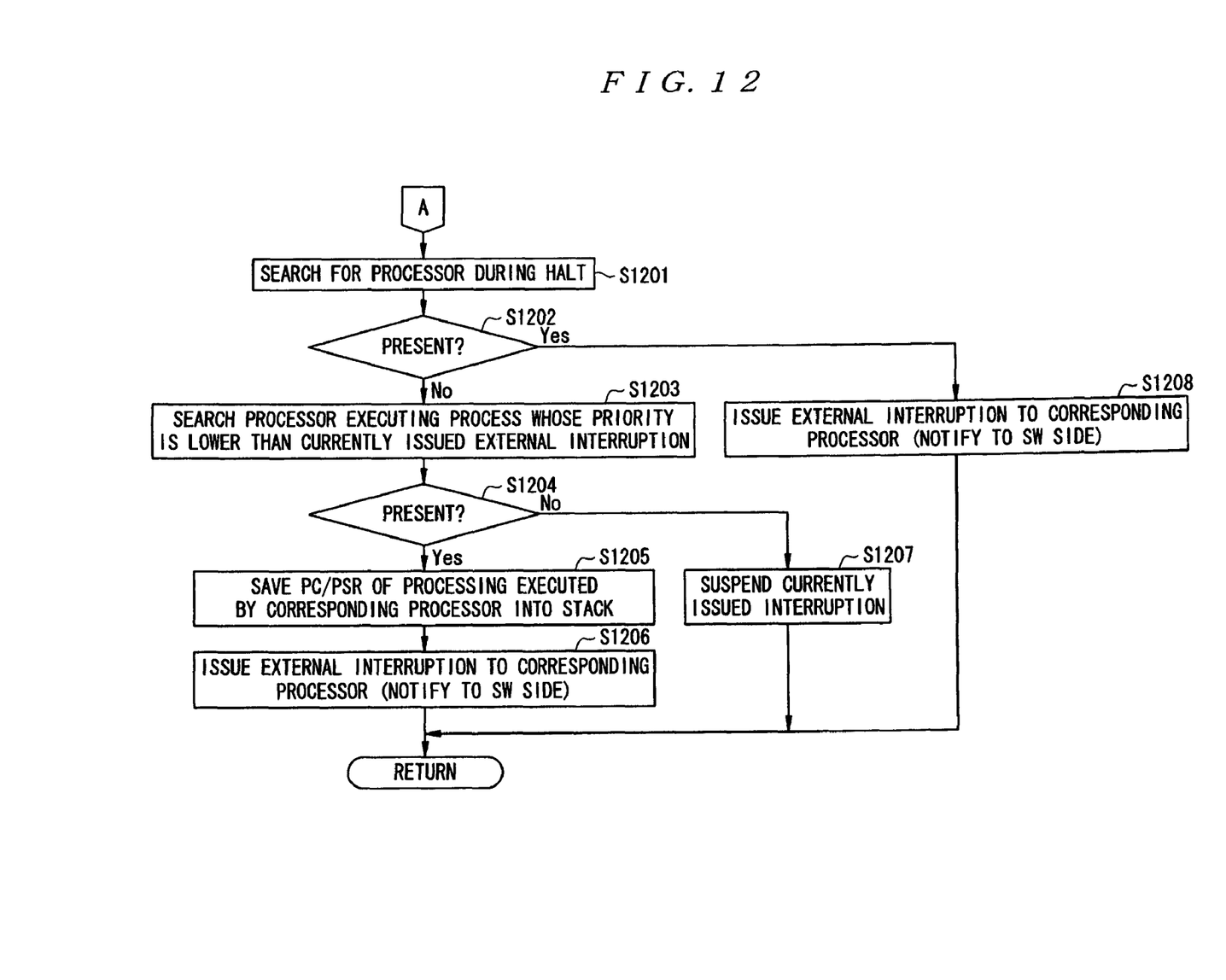
FIG. 12 is another flowchart for illustrating an operation when a static interruption and a dynamic interruption by an external interruption of an embodiment of the present invention is processed.

If it is determined that the issued external interruption is a dynamic interruption, the interruption controlling unit 201 executes processing shown in the flowchart of FIG. 12. Thus, the interruption controlling unit 201 searches the unit processors included in the multi-processor for a unit processor during HALT (S1201). If a unit processor during HALT is present as a result of searching (S1202: Yes), an external interruption is issued to the unit processor (1208).

If it is determined that no unit processor during HALT is present at the step S1202 (S1202: No), the priority of tasks and an interruption handler executed by all the unit processors P0 to P3 and that of the currently requested processing are compared. Then, whether any of the task and interruption handlers whose priority is lower than that of the task of the currently issued external interruption is executed or not is determined (S1203). If no corresponding unit processor is present (S1204: No), the currently issued external interruption is suspended (S1207).

On the other hand, if a unit processor that executes a task or an interruption handler whose priority is lower than that of the currently issued interruption handler is present (S1204: Yes), the unit processor saves information (PSR210, PC211) relating to previously executed processing (S1205). After saving the information, the interruption controlling unit 201 issues an external interruption to the specified unit processor (S1206).

The program for causing a computer to execute the controlling method of the multi-processor system of the embodiment described in FIGS. 8 to 12 is provided on a computer readable storage medium such as a CD-ROM, a floppy (registered trademark) disk (FD), DVD and the like in a form that can be installed or executed. The program for causing a computer to execute a controlling method of a multi-processor system of the embodiment may be adapted to be provided by being stored on a computer connected to a network such as the Internet and downloaded over the network.

The program for causing a computer to execute the controlling method of the multi-processor of the abovementioned embodiment may be provided on a memory device such as a computer readable ROM, a flash memory, a memory card, a USB connected flash memory or the like.

The abovementioned embodiment can accept a dynamic task and a dynamic interruption that can be executed by any of the unit processors, and a static task and a static interruption that can be executed only by a specified unit processor among the unit processors. The embodiment can allocate each of the accepted processing to the unit processors P0 to P3 according to the priority of the tasks and interruption handlers.

What is claimed is:

1. A multi-processor system with a plurality of unit processors, comprising:
    an interrupt priority setting section that accepts an interrupt request output from a peripheral device and that sets priority to the interrupt request in accordance with details of the interrupt request;
    a to-be-allocated unit processor setting section that sets a first interrupt request which is executable on any of the plurality of unit processors, or a second interrupt request which is executable on a specified unit processor out of the plurality of unit processors, to the interrupt request output from the interrupt priority setting section;
    a first interrupt request priority judging section that determines whether any of the plurality of unit processors are in HALT, and if none of the plurality of unit processors are in HALT, compares a priority of the first interrupt request and a priority of an interrupt request currently being executed on all the unit processors, and that judges whether the first interrupt request has a higher priority than the interrupt currently being executed on any of the plurality of unit processors;
    a second interrupt request priority judging section that compares a priority of the second interrupt request and a priority of an interrupt request currently being executed on the specified unit processor, and that judges whether the second interrupt request has a higher priority than the interrupt request currently being executed on the specified unit processor; and
    a unit processor selecting section that selects a unit processor to which the first interrupt request is allocated based on the judgment of the first interrupt priority judging section, or selects a unit processor to which the second interrupt request is allocated based on the judgment of the second interrupt request priority judging section.

2. The multi-processor system according to claim 1, wherein said unit processor selecting section allocates the first interrupt request or the second interrupt request to the selected unit processor by comparing the priority between the first interrupt request and the second interrupt request.

3. The multi-processor system according to claim 1, wherein said unit processor selecting section allocates the second interrupt request to the selected unit processor in preference to the first interrupt request.

4. The multi-processor system according to claim 1, wherein the to-be-allocated unit processor setting section determines a unit processor to be allocated to the first interrupt request when execution of the first interrupt request is requested by the peripheral device.

5. The multi-processor system according to claim 1, wherein the to-be-allocated unit processor setting section previously sets a unit processor to be allocated to the second interrupt request.

6. The multi-processor system according to claim 1, wherein when the first interrupt request has low priority, the first interrupt request is held, or when the first interrupt request has high priority, execution of the interrupt request being currently executed is suspended and the first interrupt request is executed.

7. The multi-processor system according to claim 1, wherein when the second interrupt request has low priority, the second interrupt request is held, or when the second interrupt request has high priority, execution of the interrupt request being currently executed is suspended and the second interrupt request is executed.

8. A method of controlling a multi-processor system with a plurality of unit processors, including an interrupt priority setting section, a to-be-allocated unit processor setting section, a first request priority judging section, a second request priority judging section, and a unit processor selecting section, comprising:
    an interrupt priority setting step of accepting by the interrupt priority setting section an interrupt request output from a peripheral device and of setting priority to the interrupt request in accordance with details of the interrupt request;
    a to-be-allocated unit processor setting step of setting by the to-be-allocated unit processor setting section a first interrupt request which is executable on any of the plurality of unit processors, or a second interrupt request which is executable on a specified unit processor out of the plurality of unit processors, to the interrupt request output from the interrupt priority setting step;
    an interrupt request priority judging step of determining by the first request priority judging section whether any of the plurality of unit processors are in HALT, and if none of the plurality of unit processors are in HALT, comparing by the first request priority judging section a priority of the first interrupt request and a priority of an interrupt request currently being executed on all the plurality of unit processors, and of judging whether the first interrupt request has a higher priority than the interrupt request currently being executed on any of the plurality of unit processors,
    or comparing by the second request priority judging section a priority of the second interrupt request and a priority of an interrupt request currently being executed on the specified unit processor, and of judging whether the second interrupt request has a higher priority than the interrupt request currently being executed on the specified unit processor; and
    a unit processor selecting step of selecting by the unit processor selecting section a unit processor to which the first interrupt request or the second interrupt request is allocated based on the judgment of the interrupt request priority judging step.

* * * * *